Nov. 25, 1958  V. LANGEN ET AL  2,861,827
BALL AND SOCKET JOINTS
Filed Nov. 23, 1953
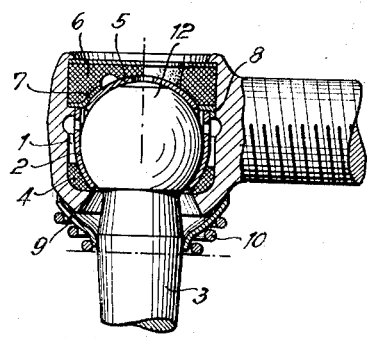
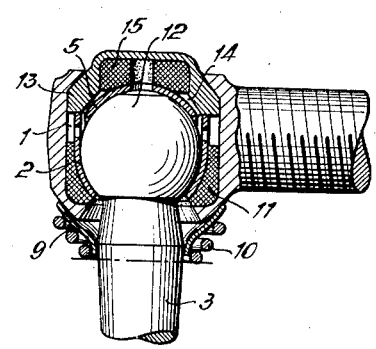
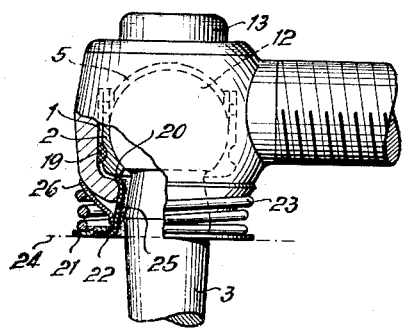
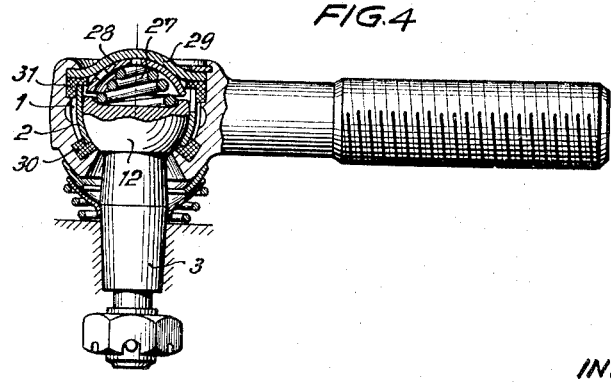
INVENTORS
VICTOR LANGEN
JOSEF LATZEN
JAKOB VOGT AND
JOHANNES ORTHEIL
BY Robert H. Jacob
AGENT 2,861,827
Patented Nov. 25, 1958

2,861,827
BALL AND SOCKET JOINTS

Viktor Langen, Meererbusch, and Josef Latzen and Jakob Vogt, Dusseldorf-Oberkassel, and Johannes Ortheil, Anrath (Lower Rhine), Germany, assignors to A. Ehrenreich & Cie., Dusseldorf-Oberkassel, Germany, a body corporate of Germany Application November 23, 1953, Serial No. 393,858

5 Claims. (Cl. 287—90)

This invention relates to a ball and socket joint for all purposes and more especially for the steering gear of power vehicles, having a lower seating for the ball formed by a shell-like body inserted in the socket.

According to the invention, a yielding elastic cushion, preferably of rubber, is provided between the shell-like insertion, which forms the lower seating of the ball and socket. This elastic cushion supports the shell-like insertion forming the seating of the ball both in the direction of the axis of the joint and also at right angles to the axis. By this means the parts of the joint are protected from shocks and noise is dampened.

Preferably, an elastic or resilient support is also provided at the upper side of the ball. Owing to this further elastic support, the insensitivity of the joint to shocks is increased and further protection is afforded to the joint. The support can consist of a spring support of any suitable kind.

It is advantageous to make both the elastic cushion which supports the shell-like insertion in the socket, and also the support on the upper side of the ball in the form of an intermediate layer of rubber. The intermediate rubber layer economises space and, above all, can take up stresses acting in all directions without being injured by such stresses. Of course, the arrangement of the intermediate layer of rubber does not exclude the additional arrangement of a spring acting on the ball.

For the lower seating of the ball, there may simply be provided an elastic intermediate cushion at the opening through which the pin on the ball extends out of the socket. It is also possible to make the shell-like lower seating for the ball thicker and so that it is preferably cylindrical on the outside and to provide it with an external groove in which the elastic cushion in the form of a rubber ring is inserted. This form of construction is particularly robust and is, therefore, suitable for joints which are subject to high stresses.

The elastic or resilient support on the upper side of the ball can take the form of an intermediate layer such as an annular rubber disc between the closure member of the socket and the upper edge of the shell forming the lower seating for the ball. In this case the rubber disc can engage in the space between the socket and the insertion shell forming the lower seating for the ball, so that the annular rubber disc acts to centre the insertion shell and, therefore, also the ball in the socket. Further, the construction of the upper elastic cushion in the form of an annular rubber disc allows the arrangement of a spring which pushes the ball on to its seating while maintaining at the same time the resilient support of the ball seating against the closure member of the socket.

The invention includes also a construction of the ball joint such that the elastic intermediate layer for the insertion shell forming the lower seating of the ball, also forms a support for the insertion shell at the edge of the opening through which the pin on the ball extends from the socket. With this form of construction, the elastic intermediate layer may be particularly small and gives an increased cushioning effect.

Preferably, the lower rubber intermediate cushion has an extension in the form of a rubber collar which prevents the penetration of dirt and dust into the joint. If the rubber cushion for the lower seating of the ball is of tubular form, the rubber cushion can be extended to form a sealing collar which bears against the pin of the ball.

Various constructions of ball joints in accordance with the invention are illustrated, by way of example, in the accompanying drawing.

Figure 1 shows a longitudinal section through a ball and socket joint in which the shell-like insertion body is elastically supported adjacent the opening through which the pin on the ball extends out of the socket and the upper support for the ball consists of a rubber cushion;

Figure 2 is a longitudinal section through a ball joint of a slightly modified construction;

Figure 3 is a longitudinal section through a ball joint having a thicker insertion body;

Figure 4 is a longitudinal section through a ball joint in which the elastic intermediate cushion also forms a support at the edge of the opening through which the pin of the ball extends from the socket.

In the examples shown in Figs. 1, 2, 3 and 4, a shell 2 is inserted in the bore of the socket, a space 1 being left between the outer surface of the shell and the bore.

In Figure 1 an elastic cushion 4 of rubber is inserted in the space between the shell 2 and the bore of the socket at the opening through which the pin 3 of the ball projects from the socket. The shell 2 extends above the transverse plane through the centre of the ball and the part projecting above the centre of the ball is of cylindrical shape. On the ball head 12 is placed a shell 5 which is guided in the cylindrical part of the shell 2. The shell 5 is acted upon by a rubber cushion 6 which is supported by the closure disc of the socket. Between the shell 5 and the upper edge of the shell 2 there is arranged at the edge of the shell 5 an intermediate layer 7 of sheet metal. On one side the lower edge 8 of the intermediate layer 7 engages in the gap between the shell 2 and the bore of the socket. On the other side no such engagement takes place. The numeral 9 designates a rigid sealing sleeve and the numeral 10 designates a spring which presses the sealing sleeve against the socket.

According to Fig. 2 an elastic cushion 11 of rubber extends into the space between the shell 2 and the bore of the socket up to approximately the height of the transverse plane through the centre of the ball 12. The closure member 13 of the socket seats directly on the upper edge of the shell 2, a space 14 being left between the member 13 and the shell 5. In the closure member 13 is fitted an annular rubber cushion 15 which acts on the shell 5.

In the construction shown in Fig. 3, the shell 2 is strengthened and is in the form of a cylindrical insertion body. This insertion body is provided with an external peripheral groove in which is placed a rubber ring 19. The rubber ring also bears against the surface of the bore of the socket. A sleeve 25, which is also made of rubber, has its upper edge 20 clamped between the insertion shell 2 and the edge of the mouth of the socket. The lower edge 22 of the sleeve is pressed by the spring 23 through the agency of the ring 21 against the surface 24 of the lever eye. Between the spring 23 and the sleeve 25, there is also provided a cup or shell 26.

Fig. 4 shows a ball joint in which the ball head 12 is shortened and ends approximately at the height of the transverse plane through the centre of the ball, the upper surface of the ball is recessed. A spring 27 in the recess acts on the ball head. The spring 27 is supported against the cover 29 of the socket, a shell 28 being interposed. The shell 2 which forms the seating for the ball is supported by a rubber ring at the edge of the opening through which the pin on the ball projects from the socket. The upper part of the ring 20 is situated in the space between the shell 2 and the wall of the socket. Between the cover 29 of the socket and the upper edge of the shell, is provided a rubber disc 31. The outer edge of the disc 31 engages in the space between the upper edge of the shell 2 and the wall in the socket. For this purpose, the bore of the socket is slightly enlarged.

We claim:

1. Ball and socket joint particularly for the steering gear of a motor vehicle comprising a socket having an aperture, a ball head in said socket having a stud extending through said aperture, an apertured rigid shell in said socket extending inwardly from said aperture and having a curved inner surface corresponding to and in supporting engagement with the lower portion of the surface of said ball head and a cylindrical portion extending beyond the meridial portion of said ball head, and an elastic lining disposed intermediate said shell and the wall of said socket, said lining extending from proximate said aperture over the lower portion of the outer surface of said shell, and the adjacent portion above said lower portion of said outer surface of said shell and the opposite portion of the inner wall of said socket defining a gap therebetween.

2. Ball and socket joint in accordance with claim 1 comprising a closure for said socket, an elastic ring of shorter length than said shell disposed adjacent said closure having a portion extending between the inner surface of said socket and the outer surface of said shell.

3. Ball and socket joint in accordance with claim 2 wherein said elastic ring includes a portion adjacent said closure extending over the upper edge of said shell and defining a resilient insert between said closure and said shell.

4. Ball and socket joint particularly for the steering gear of a motor vehicle comprising a socket having an aperture, a ball head in said socket having a stud extending through said aperture, an apertured rigid shell in said socket extending inwardly from said aperture and having a curved inner surface corresponding to and in supporting engagement with the lower portion of the surface of said ball head and a cylindrical portion extending beyond the meridial portion of said ball head, and an elastic lining disposed intermediate said shell and the wall of said socket, said lining extending from proximate said aperture over the lower portion of the outer surface of said shell, and the adjacent portion above said lower portion of said outer surface of said shell and the opposite portion of the inner wall of said socket defining a gap therebetween, said socket having a circumferential groove adjacent said aperture and said elastic lining being defined by an annular member disposed in said groove.

5. Ball and socket joint in accordance with claim 4 wherein said elastic ring presents a surface in engagement with the outer periphery of said shell and a shoulder substantially at right angles to said surface in engagement with the adjacent edge of said shell.

References Cited in the file of this patent

UNITED STATES PATENTS

| | | |
|---|---|---|
| 1,881,601 | Hufferd et al. | Oct. 11, 1932 |
| 1,899,645 | Sneed | Feb. 28, 1933 |
| 1,959,259 | Zerk | May 15, 1934 |
| 2,292,676 | Thiry | Aug. 11, 1942 |
| 2,425,138 | Venditty | Aug. 5, 1947 |
| 2,471,672 | Booth | May 31, 1949 |

FOREIGN PATENTS

| | | |
|---|---|---|
| 582,421 | Germany | Aug. 15, 1933 |
| 891,643 | Germany | Oct. 1, 1953 |